US005956483A

United States Patent [19]
Grate et al.

[11] Patent Number: 5,956,483
[45] Date of Patent: Sep. 21, 1999

[54] SYSTEM AND METHOD FOR MAKING FUNCTION CALLS FROM A WEB BROWSER TO A LOCAL APPLICATION

[75] Inventors: Thomas A. Grate, Redmond; Bassam A. Saliba, Kirkland, both of Wash.

[73] Assignee: Microsoft Corporation, Redmond, Wash.

[21] Appl. No.: 08/671,580

[22] Filed: Jun. 28, 1996

[51] Int. Cl.[6] .................................................. G06F 15/16
[52] U.S. Cl. .............................. 395/200.33; 395/200.47; 395/200.68
[58] Field of Search .......................... 395/200.33, 200.47, 395/200.68

[56] References Cited

U.S. PATENT DOCUMENTS

| | | | |
|---|---|---|---|
| 5,617,279 | 9/1997 | Elganal | 380/23 |
| 5,692,181 | 11/1997 | Anond et al. | 395/613 |
| 5,694,546 | 2/1997 | Reisman | 395/200.9 |
| 5,701,451 | 12/1997 | Rogers et al. | 395/600 |
| 5,710,887 | 1/1998 | Chelliah et al. | 395/226 |
| 5,721,908 | 2/1998 | Lagarde et al. | 395/610 |

OTHER PUBLICATIONS

Gaines, Porting Interactive Applications to the Web, Internet, Dec. 7, 1995, pp. 1–18.
Trevor, Exorcising Daemons: a modular and lightweight approach to deploying applications, Mar. 8, 1996, Internet, pp. 1–11.
Special Edition Using HTML, Second Edition; Electronic Version, Que Publishers, see H for HTML, May 21, 1996.
A Dynamic, Schema–Independent Web Interface for a Relational Database, R.W. Lee and S. Petrov, Dec. 12, 1995, p. 1–15.
"X Web White Papers: The X Window System and Broadway," http://www.broadwayinfo.com/bwwhitesbroadway-hcl. htm, 1997.
"A Guide to Setting Up X on the Web with Linux and Apache," http://www.csn.ul.ie/caolan/docs/XWeb.html, date.
"X Web FAQ," http://www.broadwayinfo.com/bwfaq.htm., 1997.
X11R6.3 (Broadway) Overview, http://www.opengroup.org/desktop/x/broadway.htm, 1997.
Website Professional, "Website API 1.1 SDK, Introduction and Overview," http://bos.business.uab.edu/wsapi/index.htm, Apr. 13, 1996, pp. 1–6.

(List continued on next page.)

*Primary Examiner*—Mehmet B. Geckil
*Attorney, Agent, or Firm*—Lee & Hayes, PLLC

[57] ABSTRACT

A function calling protocol and methodology allow local function calls to be embedded within HTML documents, using standard HTML (HyperText Markup Language) tags, such that a user can selectively initiate the function calls while viewing the documents with a standard World Wide Web ("Web") browser. User-invocable functions are thereby added to Web documents without modification to either existing Web browsers or HTML. In accordance with the invention, when a user initiates a local function call (by clicking on a button or other content item from within the Web browser), an HTTP (Hypertext Transfer Protocol) POST message which contains the information for making the function call is generated by the standard Web browser. This message is routed from the Web browser to an application (which runs on the same computer as the browser) using a conventional Local Host service of the computer's TCP/IP stack. The application then uses the function-calling information to make the function call on the computer. In an electronic shopping embodiment, the application is an electronic shopping client application which allows Web users to securely engage in commerce with on-line merchants over the Internet, and the Web documents of the system include functions for performing actions such as displaying the contents of a shopping basket object or a wallet object to the user.

36 Claims, 8 Drawing Sheets

OTHER PUBLICATIONS

Website Professional, "Website API 1.1 SDK, Microsoft ISABI Compatibility," http://bos. business.uab.edu/wsapi/isapi.htm, Apr. 13, 1996, pp. 1–3.

Website Professional, "Website API 1.1 SDK, General Information," http://bos.business.uab.edu/wsapi/general.htm, Apr. 13, 1996, pp. 1–7.

Website Professional, "Website API 1.1 SDK, Server Function Descriptions," http://bos.business.uab.edu/wsapi/func–i–p.htm, Nov. 11, 1996, pp. 1–12.

```
<HTML>

<!---WFCP FORMATTED CALL--->

<FORM ACTION=http://www.merchant.com/mig.dll
      METHOD="POST"
      ENCTYPE="application/x-www-form-urlencoded">

<INPUT type=hidden name=OBJECT value=MSTaxEngine.1>
      <INPUT type=hidden name=INTERFACE value=ITaxCalculation>
      <INPUT type=hidden name=METHOD value=CalculateTaxDue>
      <INPUT type=hidden name=ARGS value=arglist>

<INPUT type=submit value="Calculate Sales Tax">

</FORM>

</HTML>
```

*FIG. 2*

```
<HTML>

<!---LOCAL WFCP FORMATTED CALL--->

<FORM ACTION=http://127.0.0.1:100
      METHOD="POST"
      ENCTYPE="application/x-www-form-urlencoded">

<INPUT type=hidden name=OBJECT value=WalletOCX.1>
      <INPUT type=hidden name=INTERFACE value=IWallet>
      <INPUT type=hidden name=METHOD value=ShowWallet>
      <INPUT type=hidden name=ARGS value=arglist>

<INPUT type=submit value="Show Wallet">

</FORM>

</HTML>
```

*FIG. 3*

EVENT

A. USER VIEWS HTML DOC WITH EMBEDDED LOCAL FUNCTION CALL

B. HTTP POST WITH FN-CALLING INFO. PASSED TO TCP/IP STACK

C. HTTP POST ROUTED TO PORT LISTENER

D. PORT LISTENER LAUNCHES SHOPPER (IF NOT RUNNING) AND PASSES FN-CALLING INFO. TO SHOPPER'S FN-CALLING CODE

E. FN-CALLING CODE MAKES CALL

FIG. 7

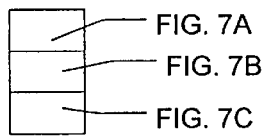

FIG. 7A

```
<HTML>
<HEAD>
<TITLE>Microsoft Shopping Basket</TITLE>
</HEAD>

<BODY BGCOLOR="#FFFFFF" TEXT="#000000" LINK="#000066"
VLINK="#808080" ALINK="#FF0000" TOPMARGIN=0
BACKGROUND="bg.gif">
<NOBR>

<! --------------- MICROSOFT® LOGO ---------------->
<A HREF="http://www.microsoft.com"><IMG SRC="mshplogo.gif"
BORDER=0 ALT="Where do you want to go today?"></A>

<! ----------------- TOOLBAR -------------------- >
<A HREF="file:base.htm"><IMG SRC="basket.gif" BORDER=0
ALT="Help" HSPACE=0></A>
<A HREF="file:history.htm"><IMG SRC="order.gif" BORDER=0
ALT="Feedback" HSPACE=0></A>
<A HREF="file:wallet.mstp"><IMG SRC="wallet.gif" BORDER=0
ALT="Help" HSPACE=0></A>
<A HREF="http://www.microsoft.com"><IMG SRC="help.gif"
BORDER=0 ALT="Help" HSPACE=0></A>
</NOBR>

<! ----------- MERCHANT SECTION ---------------- >
<HR>
<TABLE BGCOLOR=#FFFFDD BORDER=2>
<TH VALIGN=TOP WIDTH=100>

<A HREF="http://www.wal-mart.com"><IMG SRC="wm-help.gif"
BORDER=0 ALT=""><BR>Ask Ray if you have any questions ... </A>

<TD VALIGN=TOP WIDTH=470>

<CENTER> <IMG SRC="wm-logo..gif" BORDER=0 ALT=""> </
CENTER><BR,>We're glad you are shopping with us!<BR><FONT
SIZE=-2> <BR>Experience the Wal-Mart® difference on the Web - the
people, the merchandise and most of all, the prices.  Here, you'll find a
little bit of everything and more.  Thank you for shopping at Wal-
Mart®.</FONT>
</TD>

</TABLE>
```

```
<!-------------------- LINE ITEMS --------------------->
<TABLE BGCOLOR=#008080 BORDER=3>
<TR>
<TD VALIGN=TOP WIDTH=575>

<TABLE BORDER=2 BGCOLOR=#FFFFDC>

<!-------- LINE ITEM -------->
<TH BGCOLOR=#000000 BORDER=1 WIDTH=100>
<FONT FACE="ARIAL" COLOR=#FFFFFF SIZE=+1>
<B>
MS Office 95
</B>
</FONT>
<A href=
>
<BR><HR>
<IMG SRC=m<IMG SRC=office.gif
WIDTH=130 HEIGHT=130 BORDER=0 ALT="">
</A>
<FONT FACE="ARIAL" COLOR=#FFFFFF SIZE=-3>
<BR>
<NOBR>
<INPUT TYPE="CHECKBOX" NAME="LI1" Buy CHECKED>
<NOBR> $199.99 <NOBR>
Quantity: <NOBR>
2
</FONT>
</TH>
<!------ END OF LINE ITEM ------>

</TABLE>
<!------- END TABLE CONTAINING LINES ------>

<!---- TABLE CONTAINING TOTALS ----------->
<TABLE BORDER=2 BGCOLOR=#FEFEDC>

<!----- CALCULATE TAX FORM --------------->
<!----- WFCP FORMATTED CALL -------------->

<TH NOWRAP BGCOLOR=#000000 WIDTH=250>
<FONT FACE="ARIAL" COLOR=#FFFFFF SIZE =+1>
<B>Grand Total: $ 399.98</B>
</TH>
```

*FIG. 7B*

SYSTEM AND METHOD FOR MAKING FUNCTION CALLS FROM A WEB BROWSER TO A LOCAL APPLICATION

FIELD OF THE INVENTION

This invention relates to hypertext systems, such as the World Wide Web, which provide users with a mechanism for downloading and viewing hypertext documents over a distributed computer network. More particularly, this invention relates to a system for linking client-side functionality (including functionality for performing electronic commerce related services) to World Wide Web documents.

BACKGROUND OF THE INVENTION

Electronic shopping systems which make use of the World Wide Web ("Web") to transfer information between merchants and consumers are known in the art. In systems of this type, the consumer uses a standard Web browser to request and download hypertext documents from merchant Web sites. (The client and server software components of the World Wide Web are commonly referred to respectively as the "Web browser," which runs on the user's computer, and the "Web server," which runs on a Web site.) These hypertext documents, which are created using HTML (the HyperText Markup Language), contain the various product offerings and other purchase-related information of the respective merchants, and typically include forms for allowing consumers to return payment and address information to the merchants.

One significant problem with existing Web-based electronic shopping systems is that HTML does not provide a flexible mechanism for passing information between the Web browser and other applications running on the same user computer. This in-turn makes it difficult for software developers to provide specialized electronic shopping functionality (such as database structures and routines for storing and encrypting payment and shipping information) on the user computer. As a result, few (if any) Web-based electronic shopping systems include specialized client code for performing electronic shopping related functions. The present invention seeks to overcome this problem, and various related problems, while making use of existing World Wide Web components and protocols.

SUMMARY OF THE INVENTION

The present invention addresses the above problem by providing a protocol, method and client architecture for embedding client-side function calls within Web documents, and for allowing end users to selectively invoke such function calls while viewing the documents with a standard Web browser. No extensions or modifications to existing Web browsers or to HTML are required. The invention advantageously allows specialized functions (such as functions for storing and manipulating product information) to be implemented on the computer of the Web user.

In a preferred embodiment, the protocol and method are embodied within client software components of a Web-based electronic shopping system which allows Web users to securely engage in electronic commerce with on-line merchants. The system includes an electronic shopping client application ("shopping client") which runs in conjunction with the standard Web browser on the user's computer. The shopping client includes objects for storing address information, payment information and product information, and includes a set of callable functions for performing operations (e.g., editing, viewing, etc.) with respect to such information. In accordance with the invention, calls to these functions are embedded within Web documents (including Web documents served from merchant Web sites) such that end users can selectively invoke the functions while viewing the documents with the Web browser. For example, a call to a "ShowWallet" function can be embedded within a Web document to allow the user to selectively display the contents of a client-side wallet object which stores payment information. In other embodiments of the invention, the callable functions may be specific to other types of Web-based services, such as on-line banking or on-line investment services.

In accordance with one aspect of the invention, a protocol is thus provided for embedding local function calls within HTML documents using standard HTML tags. This protocol specifies a format for embedding function-calling information within HTML content using the standard GET/POST format of HTTP (the HyperText Transport Protocol). When a user clicks on a corresponding button (or other content item) from within the Web browser, the Web browser generates an HTTP POST message which includes the function-calling information needed to make the function call. This message, which serves as a function-call request message, is passed locally from the Web browser to a specialized client application (which is the shopping client in the electronic shopping implementation), which in-turn makes the specified function call.

In accordance with another aspect of the invention, a conventional Local Host service (referred to more generally as "local loop-back") of the user computer's TCP/IP stack is used in a unique manner to locally route the function-call request (HTTP POST) message from the Web browser to the specialized application. This is preferably accomplished by addressing the HTTP POST message to the IP address of the Local Host service along with a pre-selected TCP/IP port designation. This pre-selected port designation corresponds to a TCP/IP port which is monitored by a port listener of the specialized client application. When the user initiates the function call, the HTTP POST message is delivered by the Local Host service to the port listener; the port listener then launches the main program module of the specialized application (if not already running), and passes the function calling information to the program module for execution.

BRIEF DESCRIPTION OF THE DRAWINGS

These and other features of the invention will now be described with reference to the drawings of certain preferred embodiments, which are intended to illustrate and not to limit the invention, and in which:

FIG. 2 is an HTML listing illustrating a preferred method and convention for embedding client-to-server function calls within HTML documents.

FIG. 3 is an HTML listing illustrating a preferred method and convention for embedding local (client-side) function calls within HTML documents.

FIG. 7 is a listing of an HTML file used as part of a user interface for the shopping client of FIGS. 1 and 5.

In the drawings, the first digit of each reference number indicates the Figure number in which the referenced item first appears. In addition, like reference numbers are used throughout the drawings to indicate a correspondence between components.

DETAILED DESCRIPTION OF THE PREFERRED EMBODIMENTS

Figure 1:
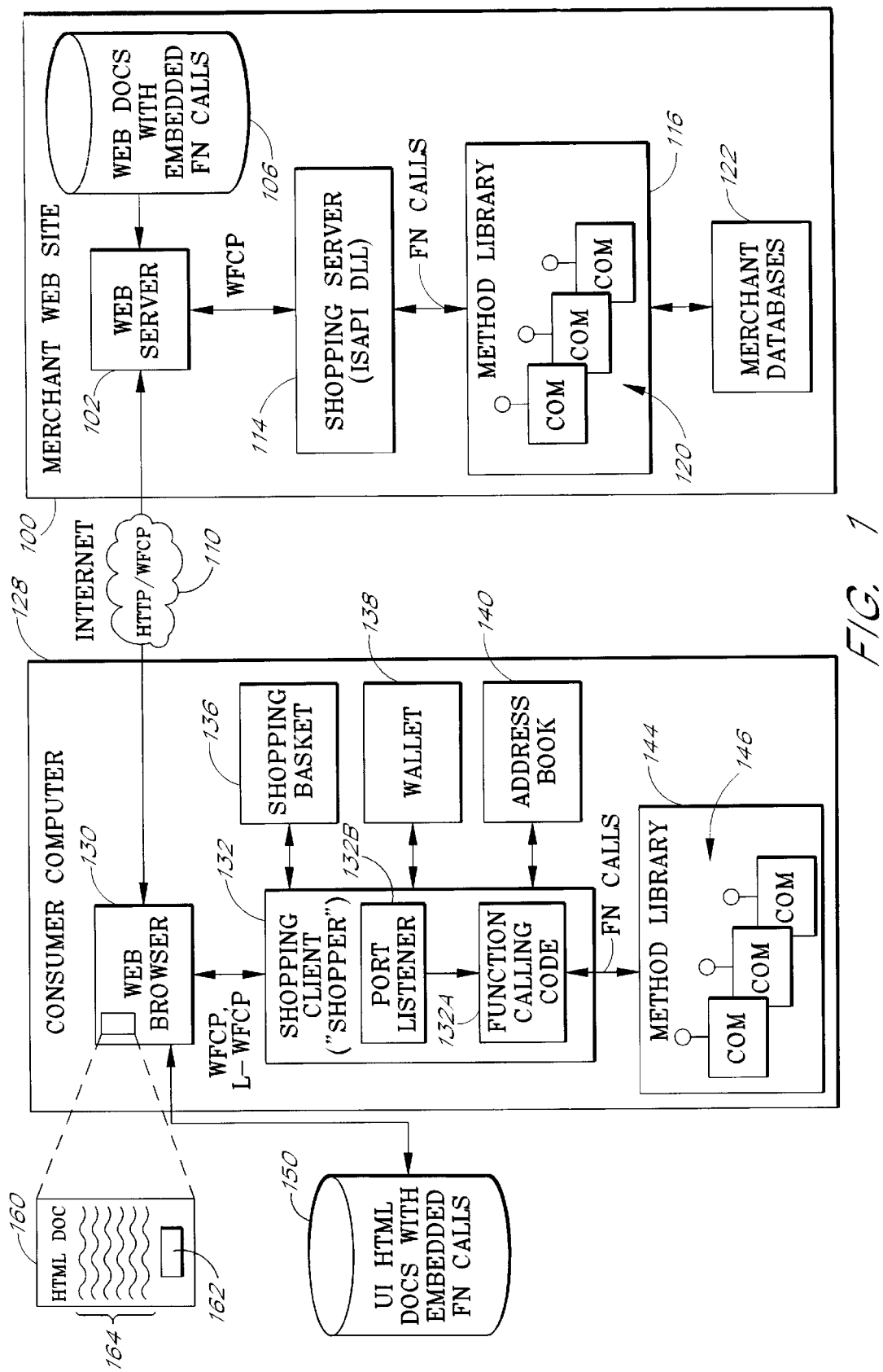
FIG. 1 is an architectural drawing illustrating the client and server components of an electronic shopping system which operates in accordance with the present invention.

The present invention provides a method and protocol for embedding client-side function calls within standard World Wide Web ("Web") documents, and for making the embedded function calls on computers of Web users during the viewing of such documents. The function calls are embedded within standard HTML content such that a user can initiate an embedded function call by clicking on a corresponding button or link while viewing the document with a standard Web browser. No additions or modifications to HTML are required.

In the preferred embodiment, the format for embedding the client-side function calls (referred to herein as "local" function calls) within HTML content is specified as part of a protocol referred to herein as the Local Web Function Calling Protocol (also referred to as "Local WFCP" or "L-WFCP"). This protocol is a variation of WFCP (the "Web Function Calling Protocol"), which allows client-to-server function calls (i.e., function calls from the Web browser to a Web site) to be embedded within HTML documents. The WFCP protocol is described in U.S. patent application Ser. No. 08/670,882, entitled SYSTEM AND METHOD FOR MAKING FUNCTION CALLS OVER A DISTRIBUTED NETWORK, which is assigned to Microsoft Corporation and is incorporated herein by reference.

In the preferred embodiment, the L-WFCP and WFCP protocols are embodied within client and server software components of an electronic shopping system which provides various services for facilitating the exchange of information between Web users and online merchants over the Internet. In this system, users (Consumers) use a standard Web browser to view the online product catalogs (in the form of HTML documents) of the various merchants of the system. These HTML catalogs include embedded L-WFCP and WFCP function calls for allowing users to initiate various actions with respect to the displayed product information. For example, a catalog page may include an embedded WFCP (client-to-server) function call which allows the user to request additional information (such as price and inventory) about a given product by clicking on a "GET PRODUCT INFORMATION" button; or, a catalog page may include an embedded L-WFCP (local) function call which allows the user to selectively add displayed product information to a client-side shopping basket of the system.

Although the present invention is described herein with reference to this preferred electronic shopping system, it will be recognized that the invention is not so limited, and can be used in a variety of other contexts in which it is desirable to embed client-side function calls within Web documents. In addition, although the invention is described with reference to HTML and HTTP, it will be recognized that the principles of the invention extend to other markup languages and transport protocols.

To facilitate a complete understanding of the invention, the remainder of the detailed description is arranged within the following sections and subsections:

1. GLOSSARY OF TERMS AND ACRONYMS
2. ARCHITECTURAL OVERVIEW OF ELECTRONIC SHOPPING SYSTEM
3. CALLING CONVENTIONS FOR WFCP AND L-WFCP FUNCTION CALLS
4. LOCAL WFCP
   (i) BACKGROUND AND MOTIVATION
   (ii) OPERATION
   (iii) PORT LISTENER START-UP AND CONFIGURATION
5. EXAMPLE USER INTERFACE DOCUMENT
6. CONCLUSION 1. Glossary of Terms and Acronyms The following terms and acronyms are used throughout the detailed description:

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as "Web documents" or "Web pages") that are accessible via the Internet, and (ii) the client and server software components which provide user access to such documents using standardized Internet protocols. Currently, the primary standard protocol for allowing applications to locate and acquire Web documents is HTTP (discussed below), and the Web pages are encoded using HTML (also discussed below). However, the terms "Web" and "World Wide Web" are intended to encompass future markup languages and transport protocols which may be used in place of (or in addition to) HTML and HTTP.

Client-Server. A model of interaction in a distributed system in which a program at one site sends a request to a program at another site and waits for a response. The requesting program is called the "client," and the program which responds to the request is called the "server." In the context of the World Wide Web, the client is a "Web browser" (or simply "browser") which runs on a computer of a user; the program which responds to browser requests by serving Web pages is commonly referred to as a "Web server."

TCP/IP (Transmission Control Protocol/Internet Protocol). A standard Internet protocol (or set of protocols) which specifies how two computers exchange data over the Internet. TCP/IP handles issues such as packetization, packet addressing, handshaking and error correction. For more information on TCP/IP, see Volumes I, II and III of Comer and Stevens, *Internetworking with TCP/IP*, Prentice Hall, Inc., ISBNs 0-13-468505-9 (vol. I), 0-13-125527-4 (vol. II), and 0-13-474222-2 (vol. III).

Local Host. A local loop-back service of most TCP/IP stacks which allows the user to test the installation of TCP/IP software on a computer. Local Host designates an IP address which correspond to the local machine. When a program sends a message to this address (which is an address beginning with 127 in TCP/IP), the protocol software of the computer returns the message without sending the message over the network. For additional information on Local Host, see pages 28–29 of W. Richard Stevens, *TCP/IP Illustrated*, vol. 1, Addison-Wesley Publishing Co., 1994 (ISBN 0-201-63346-9).

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or "HTML document") is subsequently transferred from a Web server to a browser, the codes are interpreted by the browser and used to parse and display the document. In addition to specifying how the Web browser is to display the document, HTML tags can be used to create links to other Web documents (commonly referred to as "hyperlinks"). For more information on HTML, see Ian S. Graham, *The HTML Source Book*, John Wiley and Sons, Inc., 1995 (ISBN 0471-11894-4).

Port or Port Number: (Also referred to as "socket number.") In the context of the Internet, a numerical identifier (normally provided in conjunction with an IP address) which is used by TCP/IP to direct incoming data to a particular application. Certain ports have been reserved by the Internet Assigned Number Authority (IANA) for certain applications. For example, port 80 is reserved for HTTP, and is used on Web sites to direct incoming traffic to a Web server. (See "URL" below.)

URL Uniform Resource Locator). A unique address which fully specifies the location of a file or other resource on the Internet. The general format of a URL is protocol:// machine address:port/path/filename. The port specification is optional, and if none is entered by the user, the browser defaults to the standard port for whatever service is specified as the protocol. For example, if HTTP is specified as the protocol, the browser will use the HTTP default port of 80.

HTTP (Hypertext Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

HTTP POST. A type of HTTP message which is used to request that the Web server accept information from the Web client. This information may, for example, be in the form of a message to be posted to a newsgroup, or a database submission which is executed by a CGI script. (See "CGI" below.)

MIME (Multipurpose Internet Multimedia Extensions) Type. A file extension or attachment which specifies the type or format of the file (e.g., HTML, text, graphics, audio, etc.). MIME typing allows the Web browser to determine how to process a file that is received from a Web server. For example, a file of MIME type HTML (extension ".htm" or ".html") will be displayed by the browser, while a file of MIME type X-WAV (extension ".wav") will typically be passed to an audio player which can handle the Microsoft WAV format. Standard Web browsers come pre-configured to handle popular MIME types, and can be configured by the user to handle new MIME types.

Internet Firewall. A security system placed between the Internet and an organization's network (such as a LAN) to provide a barrier against security attacks. Internet firewalls typically operate by monitoring incoming and/or outgoing traffic to/from the organization's network, and by allowing only certain types of messages to pass. For example, a firewall may be configured to allow the passage of all TCP/IP traffic addressed to port 80, and to block all other traffic. For more information of Internet Firewalls, see Chapman and Zwicky, *Building Internet Firewalls*, O'Reilly publishing, 1995 (ISBN 1-56592-124-0).

CGI (Common Gateway Interface). A standard interface which specifies how a Web server (or possibly another information server) launches and interacts with external programs (such as a database search engine) in response to requests from clients. A CGI program (called a CGI "script") may be invoked, for example, when a Web user fills out an on-screen form which specifies a database query. For more information on CGI, see Ian S. Graham, *The HTML Source Book*, John Wiley and Sons, Inc., 1995 (ISBN 0471-11894-4), pp.231–278.

ISAPI (Internet Server Application Program Interface). Microsoft's interface for allowing a Web server (or other information server) to launch and interact with external programs in response to requests from clients. ISAPI programs are in the form of dynamic link libraries (DLLs) which run in the same process space as the Web server. Documentation on ISAPI is available from Microsoft Corporation as part of the Microsoft Internet Information Server Software Development kit.

2. Architectural Overview of Electronic Shopping System

FIG. 1 illustrates the client-server architecture of a preferred electronic shopping system which operates in accordance with the invention. A merchant Web site 100 includes a standard Web server 102 for serving Web documents (stored on a storage device 106) to potential consumers over the Internet 110. These Web documents include catalog information (preferably in HTML format) of the various product offerings of the merchant. In addition, the Web documents include embedded WFCP and L-WFCP function calls which can be selectively invoked by end users (also referred to herein as "consumers") while viewing the Web documents. (Although referred to as embedded "function calls" in this description, it should be understood that the actual "call" is not made until a user clicks on the corresponding button or link within the document.) Although it may be assumed for purposes of this description that the merchant Web site corresponds to a single online merchant, it should be recognized the merchant Web site could alternatively be in the form of an online shopping mall which serves the catalog information of many different merchants.

With further reference to FIG. 1, the merchant Web site 100 also includes a specialized shopping server 114 which runs in conjunction with the Web server 102. In the preferred embodiment, the shopping server 114 is in the form of an ISAPI dynamic link library (ISAPI DLL) which runs in the same process space as the Web server 102. In other implementations, the shopping server 114 may be in the form of a CGI script, or a DLL which uses another server extension API other than Microsoft's ISAPI.

The shopping server 114 makes function calls (in response to user-initiated WFCP function call requests made over the Internet 110, as described below) to a server-side method library 116. The method library 116 includes COM (Component Object Model) objects 120 which include methods for serving non-HTML information stored within one or more merchant databases 122. (In COM terminology, functions are referred to as "methods.") This information may include, for example, relatively dynamic product information (such as price and inventory) which is not contained within merchant's HTML catalog. The method library 116 also includes methods for performing other shopping-related services, such as order capture and calculations of sales taxes and shipping/handling costs. Examples of specific server-side methods are provided in Table 1.

TABLE 1

| Method | Description |
| --- | --- |
| GetLineItem | Retrieves product information given SKU (stock keeping unit) number or other product identifier. |
| GetPrice | Retrieves price information given SKU number or other product identifier. |
| CalculateSH | Calculates shipping and handling costs given product/s and shipping logistics (e.g., shipping address and method). |
| CalculateTaxDue | Calculates shipping and handling costs given product/s and shipping logistics |
| ProcessOrder | Captures order submitted by consumer, and processes in a manner specified by merchant. |

With further reference to FIG. 1, a consumer computer 128 includes a standard Web browser 130, such as the Microsoft Internet Explorer version 2.0 or Netscape Navigator version 2.0, for connecting to Web sites over the Internet 110. The consumer computer 128 also includes a shopping client application 132 (referred to as the "Shopper") which runs in conjunction with the Web browser 130 (preferably as a separate process from the Web browser) as a client of the shopping server 114. The Shopper 132 includes three primary objects: a shopping basket object 136, a wallet object 138, and an address book object 140. (The data stored by these objects resides within corresponding files stored on the consumer's hard drive.) The shopping basket object 136 stores, under the control of the consumer, information on merchants and products that are of interest to the consumer. The wallet object 138 stores and provides access to payment source data, such as credit card numbers and checking account numbers, used for making online purchases. The address book object 140 stores and provides access to address information for shipping purposes.

The Shopper 132 includes function calling code 132A which makes function calls to a client-side method library 144. These function calls are made by the Shopper 132 in response to WFCP and L-WFCP function call requests messages received from the Web browser 130. (As described below, these function call request messages are in the form of standard HTTP POST messages and MIME messages.) The Shopper 132 also includes a port listener 132B (also referred to as a "mini Web server") which continuously monitors a predetermined TCP/IP port for L-WFCP function call request messages from the Web browser 130.

The method library 144 includes methods for performing various operations with respect to the shopping basket, wallet and address book objects 136, 138, 140. For example, the library 144 includes an AddLineItem method for adding user-selected product information to the shopping basket 136. These methods are in the form of COM objects 146 stored on the consumer computer 128, and are called by function calling code 132A of the Shopper 132. These methods are generally of two types: (i) methods which can be invoked by the shopping server 114 (such as an UpdateOrderInfo method) in response to execution of server-side (WFCP) function calls, and (ii) locally-invoked (L-WFCP) methods which do not involve any transfer of information over the Internet (such as a ShowWallet method, which shows the consumer the contents of the Wallet object 308). Examples of these client-side methods are provided in Table 2.

TABLE 2

| Method | Description |
| --- | --- |
| AddLineItem | Adds line item (stock keeping unit number, description, image, etc.) to shopping basket. Can be invoked by the user while viewing an HTML catalog page. |
| SubmitOrder | Takes all items saved in the shopping basket, requests payment information, encrypts the payment and shopping basket information, and then sends the encrypted information to the Merchant Server. Can be invoked by the user while viewing the contents of the shopping basket. |
| ShowWallet | Displays to the user the contents of the Wallet. |
| ShowAddressBook | Displays to the user the contents of the Address Book. |
| ModifyWallet | Pops up a dialogue that allows the user to add/delete/modify credit card and other payment information. |
| ModifyAddressBook | Pops up a dialogue that allows the user to add/delete/modify addresses stored within the address book. |
| ViewBasket | Builds an HTML file from the items currently stored within the shopping basket, and then passes the HTML file to the browser for display. |
| ViewHistory | Builds an HTML file from the items currently stored within a history file, and then passes the HTML file to the browser for display. Allows merchants to add a button that lets the consumer jump from a catalog page to a list of the items that have been purchased from the merchant. |
| DeleteItem | Removes a user-selected item from the shopping basket while the user is viewing the contents of the basket. |
| UpdateOrderInfo | Saves into the basket information that is common to a set of line items from the same merchant (e.g., tax and S/H charges). Invoked, for example, when the user selects an "UPDATE" button to obtain detailed pricing information on the entire shopping basket. |

The Shopper 132 also includes one or more user interface ("UI") HTML documents which are stored locally on a storage device 150 of the consumer computer. These user interface documents include embedded L-WFCP function calls for performing various local operations, such as viewing and modifying the contents of the shopping basket, wallet and address book. The user interface HTML documents may also include embedded WFCP function calls (and other hyperlinks) to popular merchant Web sites of the system. (A listing of an example user interface HTML document is attached as FIG. 7.)

In the preferred embodiment, the consumer computer 128 runs the Microsoft Windows® NT, Microsoft® Windows 95, or Microsoft® Windows 3.1 operating system. As is conventional, the operating system includes a TCP/IP stack (shown in FIG. 5) which handles all incoming and outgoing message traffic passed over the Internet 110. As described below, a Local Host service of the TCP/IP stack is used, in accordance with the present invention, to pass L-WFCP function call requests from the Web browser 130 to the Shopper 132.

With further reference to FIG. 1, there is depicted an HTML document 160 with an embedded (WFCP or L-WFCP) function call, as displayed to the consumer by the Web browser 130. This HTML document 160 may be a catalog document downloaded from a merchant Web site, or may be a user interface document of the Shopper 132. In this example, the embedded function call is displayed to the user as a user-selectable button 162 with an appropriate label (not shown) such as "VIEW SHOPPING BASKET" or "GET PRICE." (The function call may alternatively be displayed, for example, as a hyperlink or icon of the document.) If the HTML document is part of a merchant catalog, the button 162 may be provided in association with a textual description 164 or a graphic (FIGS. 4 and 5) of a particular product.

Figure 4:
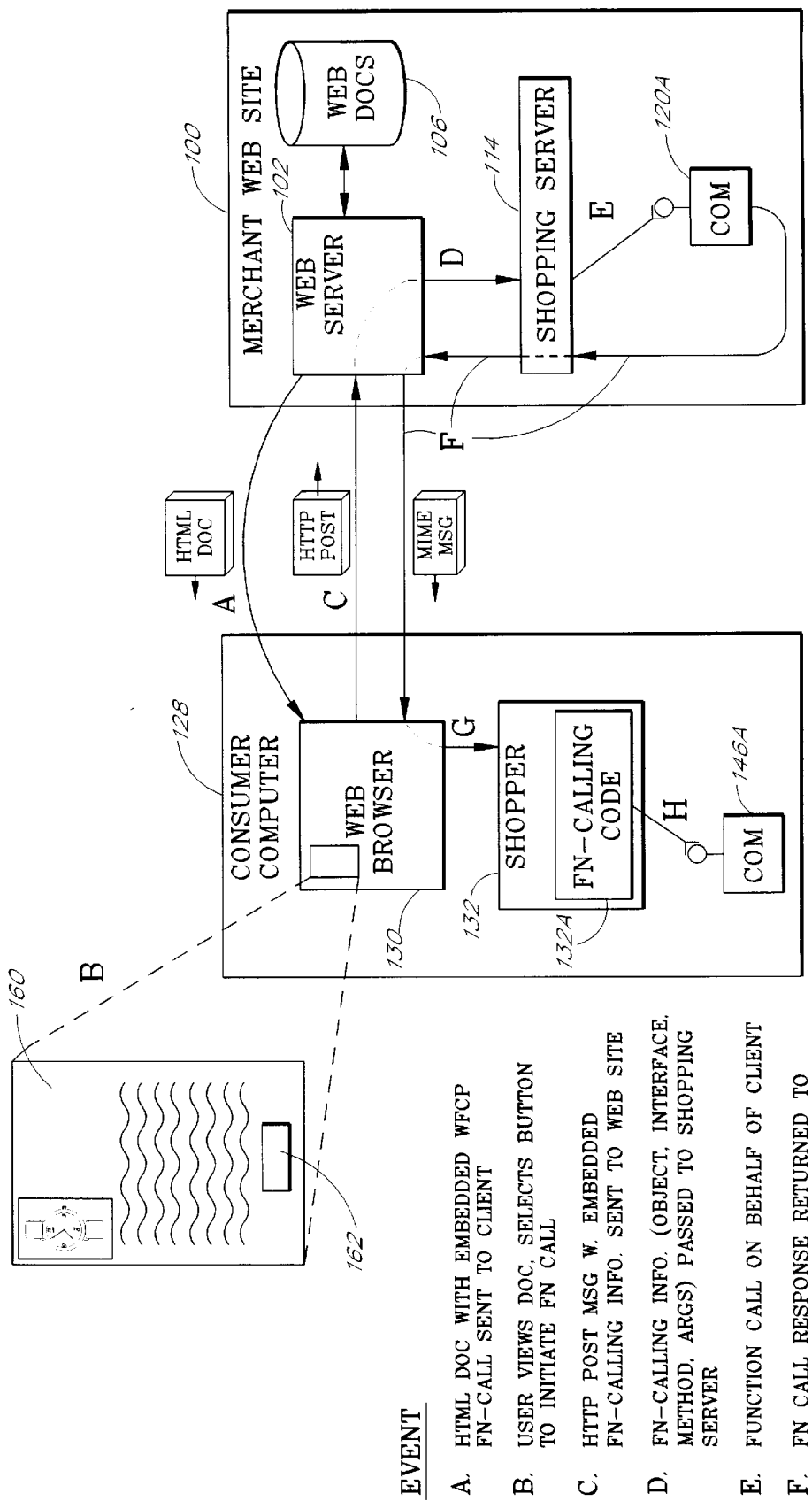
FIG. 4 is a flow diagram illustrating a typical sequence of events which occurs when a user downloads an HTML document and initiates a client-to-server function call embedded within the document.

Briefly, when the consumer selects the button 162, the Web browser 130 generates a standard HTTP POST message which serves as a function call request message. If the embedded function call is a WFCP function call (such as a request for price information), the HTTP POST message is sent across the Internet 110 to the Web server 102, which in-turn passes the function call request to the shopping server 114 for execution. The response to this server-side function call (which may optionally specify a "return" function call to be placed on the consumer computer 128) is returned across the Internet 110 to the consumer computer as a MIME message, and may be tagged with a MIME type which identifies the Shopper 132 as the recipient. (This sequence of events is illustrated in FIG. 4.)

Figure 5:
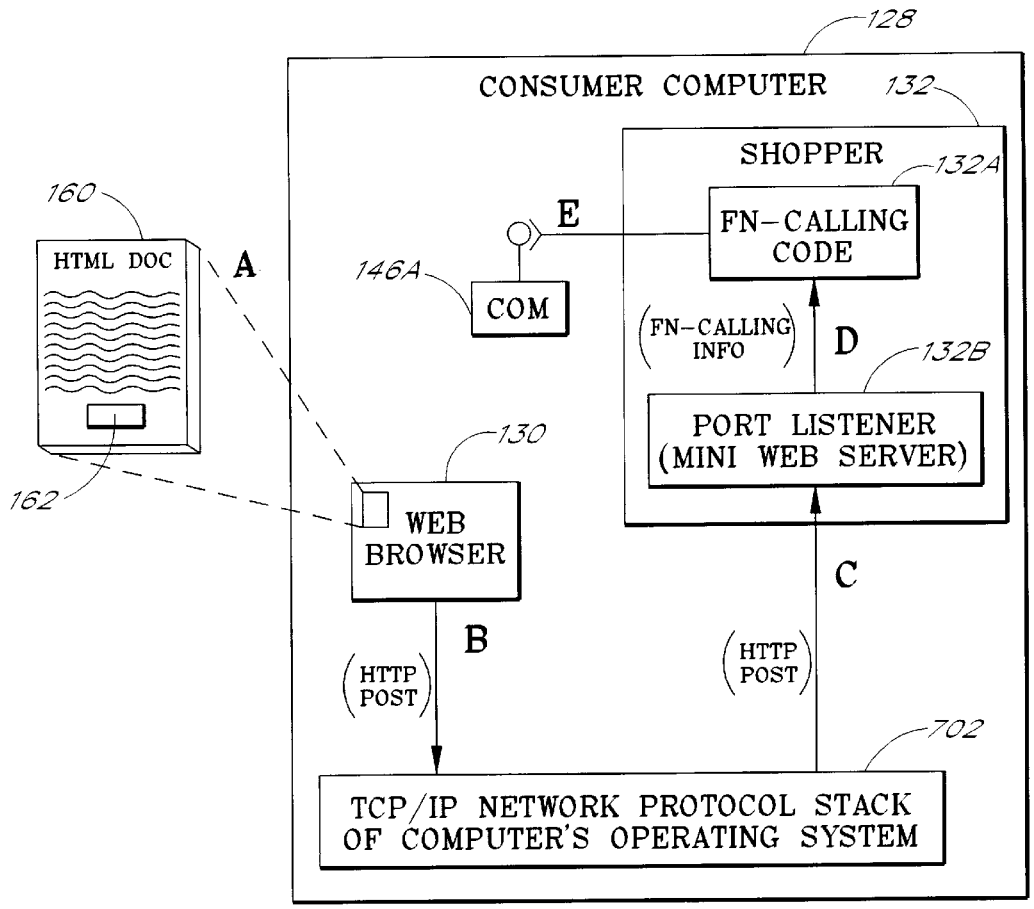
FIG. 5 is a combined architectural drawing and flow diagram illustrating a preferred process by which local function calls are made from the Web browser to the shopping client of FIG. 1.

If, on the other hand, the embedded function call is a L-WFCP (local) function call, a Local Host feature of the operating system's TCP/IP stack is used to pass the HTTP POST (function-call request) message directly to the port listener 132B of the Shopper 132. The port listener 132B then passes the function call request to the Shopper's function-calling code 132A for execution. (This process of making a L-WFCP function call is illustrated in FIG. 5 and is described in detail below.) The L-WFCP function call is thus made locally, without passing any message over the Internet 110.

3. Calling Conventions for WFCP and L-WFCP Function Calls

FIGS. 2 and 3 are example HTML sequences which illustrate, respectively, an embedding WFCP function call and an embedded L-WFCP function call. As illustrated by these HTML sequences, the function calls are embedded using the standard HTTP POST format (specifying an appropriate URL to which the HTTP POST message is to be sent), and include the following function-calling parameters (embedded using the same format):

Object. The PROG ID of the COM object to be called by the recipient (i.e., the Shopper 132 or the shopping server 114) of the function call request message. The object may, for example, be a Tax Service Provider object which performs a variety of tax operations on the server side.

Interface. The name of a COM interface of the specified COM object. In one implementation of WFCP and L-WFCP, the interface name is omitted, and all calls are assumed to be to the same interface.

Method. The name of the function to be called, such as "ShowWallet." (Note: in COM terminology, a "method" is generally synonymous with a function.)

Arguments. The data set with which the operation is to be performed. WFCP and L-WFCP advantageously allow different functions to have different numbers of arguments. In an existing implementation, the argument list is passed as a list of name-value pairs (separated by commas), and the protocol requires all arguments to be present and in order.

In the FIG. 2 sequence, a function call to server-side method CalculateTaxDue is linked to the button "Calculate Sales Tax" such that the function calling information (OBJECT, INTERFACE, METHOD and ARGS) will be sent (via an HTTP POST message) to URL "http://www.merchant.com/mig.dll" when the user selects the button from within the Web browser 130. (In this example, "www.merchant.com" identifies the merchant Web site to which the request is directed, and "mig.dll" is the file name of the shopping server 114. Because the OBJECT, INTERFACE, METHOD and ARGS are embedded with type "hidden," they are not visible to the user during normal viewing of the document.) In response to this function call request message, the merchant Web site 100 will return a MIME message which includes the requested sales tax information. The general sequence of events which occurs when a WFCP function call is initiated by the user is illustrated in FIG. 4, and is described in the above-referenced application. One important aspect of WFCP is that all function call requests and responses are passed over the Internet using standard HTTP messages; this advantageously allows consumers to access merchant Web sites of the system from behind company Internet firewalls that are configured to permit the passage HTTP traffic.

In the FIG. 3 sequence, a function call to the client-side method ShowWallet is linked to the button "Show Wallet" such that the embedded function calling information will be sent via an HTTP POST message to URL "127.0.0.1:100" when the user selects the button. This URL comprises two parts: the IP address 127.0.0.1, and a TCP/IP port designation of port 100. The IP address 127.0.0.1 is a local loopback address which is recognized by the consumer computer's TCP/IP stack (as part of the Local Host service) as identifying the local machine as the recipient of the message. The port designation of 100 is an arbitrarily-selected TCP/IP port (in the unreserved area) which is monitored by the Shopper's port listener 132B. The URL thus effectively addresses the Shopper's port listener 132B, allowing the function call request to be passed locally from the Web browser 130 to the Shopper 132. (This process of passing the function call request from the Web browser 130 to the Shopper 132 is described in the following section.) As illustrated by FIGS. 2 and 3, the present invention provides, in a preferred form of the invention, a simple, text-based format for embedding generic local and client-to-server function calls within HTML documents. Advantageously, the invention allows online merchants to add significant client-side and server-side functionality to HTML catalog documents without having to learn a complex function-calling language, and without having to convert existing HTML catalog documents to a new markup language.

In addition, because the WFCP and L-WFCP Protocols support generic function calls (as opposed to being limited, for example, to a predefined set of functions, or to a hard-coded format for passing arguments), new client-side and server-side functions can easily be added to the system by simply updating the method libraries 116, 144. Thus, the WFCP and L-WFCP protocols provide a high degree of system extensibility. This extensibility is particularly beneficial in the context of electronic commerce systems, since it is often difficult to predict the types of commerce-related services that will become popular in the future.

Although the protocols described herein are based on an object-oriented architecture, it should be understood that non-object-oriented function calls may be supported in other embodiments of the invention.

4. Local WFCP

(i). Background and Motivation

In the context of the electronic shopping system of FIG. 1, it is desirable to be able to pass information (such as HTML catalog data), under the control of the user, from the Web browser 130 to the shopping basket 136 for subsequent recall. It is also desirable to allow the user to initiate functions which allow for the viewing and editing of the contents of the wallet, address book and shopping basket objects 136, 138 and 140 from within the Web browser 130. Existing Web browsers do not, however, provide the necessary functionality for passing information contained within an HTML document from the browser 130 to a separate, local process.

One possible solution to this problem is to use WFCP to bounce messages off the shopping server 114, and to use MIME typing to route the bounced-back messages from the Web browser 130 to the Shopper 132. With reference to FIG. 1, this technique would involve configuring the shopping server 114 to bounce back WFCP messages of a certain type (e.g., WFCP messages which specify one of a predetermined set of client-side objects), and embedding corresponding WFCP function calls within HTML documents. When the user initiates the "bounce-back" WFCP function call (by clicking on the corresponding button from within the Web browser 130), the following events would occur: (1) an HTTP POST with the embedded OBJECT, INTERFACE, METHOD and ARGS would be sent over the Internet 110 to the shopping server 114 via the Web server 102; (2) the shopping server would recognize the WFCP message as being of a type which needs to be bounced back to the sender, and would repackage the message as a MIME message of type "shopper" and return this message to the Web server 102; (3) the Web server would return the MIME message over the Internet to the Web browser 130, which would in-turn pass the WFCP message to the Shopper 132 for execution.

This "bounce back" solution has a number of deficiencies. For example, the solution creates unnecessary Internet traffic, and places an unnecessary processing load on the shopping server 114. In addition, the solution degrades the perceived performance of the Shopper 132 by adding network latency to the browser-to-shopper function calling process. An important motivation behind L-WFCP was to cure these deficiencies by eliminating the use of the Internet 110 from the process.

As indicated above, L-WFCP makes use of the Local Host service of existing TCP/IP stacks in a unique manner to route function call request messages from the browser 130 to the Shopper 132. By way of background, Local Host is a TCP/IP loop-back facility which allows a user to verify that a TCP/IP stack has been set up properly on a computer. This facility is invoked whenever a message is sent to an IP address of 127.0.0.1, which TCP/IP interprets as being the local machine. If, for example, a program sends a message to the address 127.0.0.1, the local TCP/IP stack will return the message (to the same program or to a program listening on a designated port), without sending the message over the network.

(ii). Operation

The sequence of events which occurs when a user initiates a L-WFCP function call will now be described with reference to FIG. 5. Depicted in FIG. 5 is an HTML document 160 with an embedded L-WFCP function call, as displayed to the user by the Web browser 130. The HTML document 160 may, for example, be a locally-stored document which serves as part of the user interface of the Shopper 132, or may be a document selectively downloaded by the user from a Web site. In this example, it may be assumed that the embedded function call is to the ShowWallet method, and is embedded as illustrated in FIG. 3. It may also be assumed that the Shopper's port listener 132B is already running. (Several methods for launching the port listener 132B are described below.)

Figure 6:
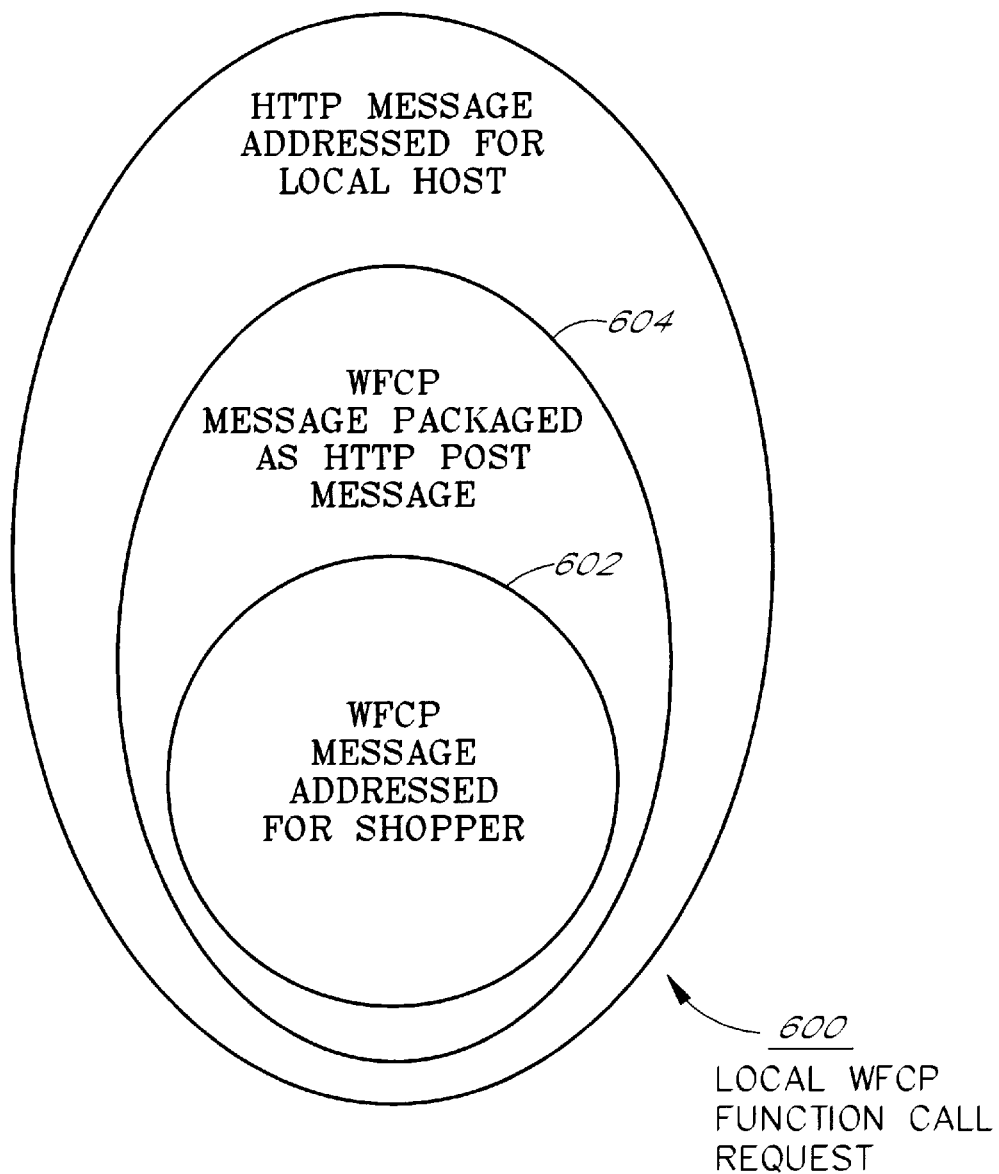
FIG. 6 illustrates how requests for local function calls are encapsulated within standard HTTP messages generated by the Web browser.

With reference to Event A, a button 162 (or other selectable content item) is displayed to allow the user to initiate the function call. In this example, the button 162 will include the label "Show Wallet" to allow the user to view the contents of the Wallet object 138. With reference to Event B, when the user clicks on the button 162, the browser 130 generates an HTTP POST message which includes the information needed by the recipient to make the function call. Referring briefly to FIG. 6, this L-WFCP "function call request" message 600 can be visualized as a WFCP message 602 (specifying the OBJECT, INTERFACE, METHOD and ARGS of a client-side function) packaged as an HTTP POST message 604. The HTTP POST message is addressed to the Local Host service of TCP/IP (IP address 127.0.0.1), with a port designation which corresponds the TCP/IP port monitored by the Shopper's port listener 132B.

With further reference to FIG. 5, the clicking event causes the Web browser 130 to attempt to resolve the URL and establish a connection. (If the consumer computer 128 operates behind an Internet firewall, it may be necessary to pre-configure the Web browser 130 to not go to the firewall proxy on Local Host messages.) This resolution process traverses the TCP/IP stack on the consumer computer 128. Because the message is addressed to a TCP/IP port being monitored by the port listener 132B, the Local Host service delivers the POST message to the port listener (Event C). With reference to Event D, the port listener 132B then launches the core code module of the Shopper 132 (if not already running), which runs as a separate process from the port listener 132B. In addition, the port listener strips off the HTTP header information and passes the WFCP function calling information to the Shopper's function calling code 132A.

With reference to Event E, the Shopper 132 then makes the client-side function call. This involves invoking the COM object 146A specified in the function-call request message, and then passing the arguments (if any) to the specified method using the specified interface. Using the ShowWallet example, this function call will open up a window which displays the contents of the Wallet object to the user.

(iii). Port Listener Start-up and Implementation

The port listener 132B is implemented as a background process which runs independently from the Shopper 132 process, without showing any window on the desktop. To ensure that the port listener 132B is running when a L-WFCP function call is initiated by the user, the port listener 132B and operating system are preferably configured such that the port listener 132B is automatically launched during operating system start-up. The manner in which this is accomplished depends upon the operating system used on the consumer computer 128. For the Microsoft Windows® NT operating system, the port listener 132B is implemented as an NT service configured for automatic start-up. For the Microsoft Windows® 95 and Microsoft Windows® 3.1 operating systems, the port listener 132B is implemented as an .EXE file, and is automatically launched by either (i) including the .EXE file in the Startup group or (ii) listing the file on the "load" line of the Windows system.ini file.

In other embodiments of the invention, the Web browser may be configured to launch the port listener 132B upon the occurrence of a particular event. For example, the Web browser may be configured (via a file association) to launch the port listener when a predefined tag is encountered by the Web browser 130; or, the operating system's TCP/IP stack may be configured to launch the port listener whenever a message is received at TCP/IP port 100.

5. Example User Interface Document

FIG. 7 (consisting of FIGS. 7A–C) is a listing of an example HTML document which is used in an existing implementation of the Shopper 132. This HTML document, which includes embedded WFCP and Local WFCP function calls, is stored on the consumer computer 128 (along with the referenced GIF files) as part of the Shopper's user interface. The function calls embedded within this document are formatted in accordance with implementations of WFCP and Local WFCP in which the name of the interface is omitted.

6. Conclusion

While certain preferred embodiments of the invention have been described, these embodiments have been presented by way of example only, and are not intended to limit the scope of the present invention. For example, although described herein with reference to an electronic shopping system, the function calling protocol and methodology of the invention can be used in other types of Web-based systems. Additionally, although the disclosure has focussed on the use of HTML and HTTP to make function calls, it will be recognized that the principles of the invention extend to other markup languages and transport protocols. Accordingly, the breadth and scope of the present invention should be defined only in accordance with the following claims and their equivalents.

In the claims which follow, alphabetic characters used to designate claim steps are provided for convenience of description only, and are not intended to imply any particular order for performing the steps.

What is claimed is:

1. A method of making a local function call from a Web browser running on a local computer, the method comprising the steps of:
   (a) sending a hypertext document from a remote Web server to the Web browser over a distributed network, the hypertext document including embedded function-calling information using HTML (hypertext markup language) tags of a hypertext markup language which does not support function calls, the embedded function-calling information being linked to a user-selectable portion of the hypertext document such that a user can initiate a corresponding function call to a local application running on the local computer while viewing the hypertext document with the Web browser;
   (b) displaying the hypertext document to the user via the Web browser;
   (c) in response to selection of the user-selectable portion from within the Web browser, sending a function-call request message as an HTTP (hypertext transport protocol) message from the Web browser to the local application running on the local computer by passing the HTTP message from a TCI/IP stack of the local computer to the local application, the function-call request message containing at least a portion of the embedded function-calling information; and
   (d) in response to the function-call request message, making the function call on the local computer.

2. The method according to claim 1, wherein step (c) comprises using a local loop-back service of a network protocol to route the function-call request message from the Web browser to the application.

3. The method according to claim 1, wherein step (c) comprises using a local host service of a TCP/IP stack of the computer to route the function-call request message from the Web browser to the application.

4. The method according to claim 3, wherein the function-call request message comprises a HTTP message.

5. The method according to claim 3, wherein the function-call request message comprises an HTTP POST message.

6. The method according to claim 1, wherein step (c) comprises sending a HTTP message from the Web browser to the application.

7. The method according to claim 1, wherein the function-calling information is embedded within the hypertext document using HTML tags.

8. The method according to claim 1, wherein the function-calling information includes a name of a function to be called and a list of arguments to be passed to the function.

9. The method according to claim 1, wherein the application runs as a separate process from the Web browser.

10. The method according to claim 9, wherein the application is an electronic shopping application.

11. The method according to claim 1, further comprising displaying the contents of an object to the user in response to the function call.

12. The method according to claim 1, further comprising displaying the contents of a shopping basket object to the user in response to the function call.

13. A method of making a local function call from a Web browser running on computer of a user, the method comprising the steps of:
   (a) displaying a Web document to the user via the Web browser, the Web document including embedded function-calling information with HTML (hypertext markup language) tags of a markup language which does not support function calls, the function-calling information being embedded within the document such that a user can initiate a corresponding function call to a local program module running on the local computer by selecting a content item of the document from within the Web browser;
   (b) in response to user selection of the content item from within the Web browser, generating a function-call request message with the Web browser and sending the function-call request message as an HTTP (hypertext transport protocol) message from the Web browser to the program module running on the local computer by passing the HTTP message from a TCP/IP stack of the local computer to the program module; and
   (c) in response to the function-call request message, making the function call with the program module.

14. The method according to claim 13, wherein step (b) comprises using a local host service of a TCP/IP stack of the computer to route the function-call request message from the Web browser to the program module.

15. The method according to claim 1, wherein the function-call request message comprises a HTTP message.

16. The method according to claim 13, wherein the markup language is HTML.

17. The method according to claim 13, wherein the function-calling information is embedded within the Web document in a textual format.

18. The method according to claim 17, wherein the function-calling information includes a name of a function to be called and a list of arguments to be passed to the function.

19. A World Wide Web document stored on a computer-readable medium, comprising:

user-viewable informational content;

a plurality of HTML (hypertext markup language) tags of a markup language which does not support function calls, the HTML tags provided in association with the informational content; and function-calling information linked to a user-selectable portion of the informational content with the HTML tags, the functional-calling information embedded within the document such that user selection of the user-selectable portion from within a Web browser program running on a user computer causes a function-call request message to be sent as an HTTP (hypertext transport protocol) message from the Web browser to an application on the user computer by passing the HTTP message from a TCP/IP stack of the user computer to the application.

20. The World Wide Web document according to claim 19, wherein the function-calling information is embedded within the document in a text-based format.

21. The World Wide Web document according to claim 19, wherein the function-calling information is embedded within the document such that user selection of the user-selectable portion causes an HTTP message to be sent from the Web browser to the application, the HTTP message containing at least a portion of the function-calling information.

22. The World Wide Web document according to claim 19, wherein the function-calling information is embedded within the document such that user selection of the user-selectable portion causes the function-call request message to be sent to the application via a local loop-back service of a network protocol.

23. The World Wide Web document according to claim 22, wherein the network protocol is or is part of TCP/IP.

24. The World Wide Web document according to claim 19, wherein the markup language is HTML.

25. The World Wide Web document according to claim 19, wherein the function-calling information comprises at least (i) an address, (ii) an identifier of a function to be called, and (iii) a set of arguments to be passed to the function.

26. The World Wide Web document according to claim 25, wherein the address corresponds to a local host service of a TCP/IP stack on the user computer.

27. The World Wide Web document according to claim 26, wherein the address includes a TCP/IP port designation which corresponds to a TCP/IP port monitored by the application.

28. The World Wide Web document according to claim 19, in combination with an application configured to receive the function-call request message and make a corresponding function call.

29. The World Wide Web document and application according to claim 28, wherein the application comprises a port listener, the port listener configured to monitor a TCP/IP address to thereby receive function-call request messages from the Web browser.

30. A computer-readable medium having computer-executable instructions stored thereon for allowing a World Wide Web user to conduct electronic commerce over the Internet from a computer of the user, comprising:

a Web browser application configured to run on the computer;

an electronic commerce client application configured to run on the computer in conjunction with the Web browser, the electronic commerce client application comprising a function library which includes a plurality of callable functions;

at least one Web document which includes embedded function-calling information that corresponds to at least one of the callable functions of the electronic commerce client application, the function-calling information embedded within the Web document such that the user can selectively initiate a call to at least one function while viewing the Web document with the Web browsers; and wherein response to user initiation of the call, the Web browser generating a function-call request message and sending the function-call request message as an HTTP (hypertext transport protocol) message from the Web browser to the electronic commerce client application by passing the HTTP message from a TCP/IP stack of the local computer to the electronic commerce client application.

31. The computer-readable medium according to claim 30, wherein the function-calling information is embedded within the Web document such that at least a portion of the function-calling information is passed from the Web browser to the electronic commerce client application via a standard HTTP message when the user initiates the function call.

32. The computer-readable medium according to claim 31, wherein the Web document and the electronic commerce client application are configured such that the HTTP message is passed from the Web browser to the electronic commerce client application using a local loop-back service of a TCP/IP stack.

33. The computer-readable medium according to claim 30, wherein the electronic commerce client application comprises a port listener which monitors a TCP/IP port for function-call request messages from the Web browser.

34. The computer-readable medium according to claim 30, wherein the function-calling information is embedded within the Web document with tags of a markup language which does not support function calls.

35. The computer-readable medium according to claim 30, wherein the function-calling information is embedded within the Web document in a text-based format.

36. The computer-readable medium according to claim 30, wherein the electronic commerce client application has a user interface which includes the at least one Web document.

* * * * *